US008207635B2

(12) United States Patent
Covaro

(10) Patent No.: US 8,207,635 B2
(45) Date of Patent: Jun. 26, 2012

(54) DIGITAL SWITCH COMMUNICATION

(75) Inventor: Mark Covaro, Sonoma, CA (US)

(73) Assignee: Redwood Systems, Inc., Fremont, CA (US)

( * ) Notice: Subject to any disclaimer, the term of this patent is extended or adjusted under 35 U.S.C. 154(b) by 242 days.

(21) Appl. No.: 12/536,231

(22) Filed: Aug. 5, 2009

(65) Prior Publication Data

US 2010/0213759 A1    Aug. 26, 2010

Related U.S. Application Data

(63) Continuation-in-part of application No. 12/389,868, filed on Feb. 20, 2009.

(51) Int. Cl.
    *H04B 1/48* (2006.01)
(52) U.S. Cl. ......... 307/112; 307/139; 307/140; 307/154
(58) Field of Classification Search ............. 307/1, 112, 307/139–140, 154
    See application file for complete search history.

(56) References Cited

U.S. PATENT DOCUMENTS

| | | | | |
|---|---|---|---|---|
| 3,660,738 | A | | 5/1972 | Anderson et al. ............. 318/138 |
| 4,578,533 | A | | 3/1986 | Pierce ................................ 179/2 |
| 4,725,762 | A | * | 2/1988 | Jagschitz ...................... 315/226 |
| 4,737,787 | A | * | 4/1988 | Ito et al. ..................... 340/870.18 |
| 4,740,952 | A | * | 4/1988 | Vernieres et al. ............. 370/284 |
| 4,949,359 | A | * | 8/1990 | Voillat ........................... 375/257 |
| 5,293,628 | A | | 3/1994 | Langan et al. ................. 395/550 |
| 5,396,555 | A | | 3/1995 | Shibata et al. ................ 379/412 |
| 5,473,635 | A | * | 12/1995 | Chevroulet ................... 375/287 |
| 5,627,833 | A | | 5/1997 | Bliven .......................... 370/464 |
| 5,684,826 | A | | 11/1997 | Ratner ......................... 375/222 |
| 5,793,754 | A | * | 8/1998 | Houldsworth et al. ....... 370/276 |
| 5,798,913 | A | | 8/1998 | Tiesinga et al. ................. 363/21 |
| 5,903,607 | A | * | 5/1999 | Tailliet ......................... 375/257 |
| 5,905,406 | A | | 5/1999 | Sugden et al. ................ 329/312 |
| 6,097,761 | A | | 8/2000 | Bühring et al. ............... 375/257 |
| 6,111,918 | A | * | 8/2000 | Gotaas ......................... 375/257 |
| 6,144,292 | A | | 11/2000 | Brown ..................... 340/310.02 |
| 6,295,356 | B1 | | 9/2001 | De Nicolo .................... 379/413 |

(Continued)

FOREIGN PATENT DOCUMENTS

EP    1 087 506 A2    3/2001

(Continued)

OTHER PUBLICATIONS

U.S. Appl. No. 12/790,038, filed May 28, 2010, Covaro et al.

(Continued)

*Primary Examiner* — Adi Amrany
(74) *Attorney, Agent, or Firm* — Brinks Hofer Gilson & Lione

(57) ABSTRACT

In one example, an electric circuit may be provided that is coupled to a line. The electric circuit may include a switch connected in series with a load, where the switch and the load are in series between two conductors of the line. The line may provide power to the load. The electric circuit may also include a resistive element connected in parallel with the switch and in series with the load. The switch may be configured to short circuit the resistive element when closed such that the voltage on the line varies between two voltage levels when the switch is opened and closed. The line provides power to the load when the switch is opened and when the switch is closed.

22 Claims, 11 Drawing Sheets

U.S. PATENT DOCUMENTS

| | | | |
|---|---|---|---|
| 6,348,780 B1 | 2/2002 | Grant | 323/222 |
| 6,496,104 B2 | 12/2002 | Kline | 340/310.01 |
| 6,535,983 B1 | 3/2003 | McCormack et al. | 713/310 |
| 6,549,120 B1 | 4/2003 | De Buda | 340/310.01 |
| 6,654,409 B1 | 11/2003 | Scott et al. | 375/220 |
| 6,853,173 B2 | 2/2005 | Caine et al. | 323/285 |
| 6,870,282 B1 * | 3/2005 | Bischoff et al. | 307/130 |
| 6,980,122 B2 * | 12/2005 | Novikov | 340/12.32 |
| 7,005,969 B2 | 2/2006 | Fisher et al. | 340/310.01 |
| 7,012,505 B1 | 3/2006 | Arden | 340/310.01 |
| 7,102,490 B2 | 9/2006 | Flen et al. | 340/310.18 |
| 7,113,547 B2 | 9/2006 | Inoue et al. | 375/256 |
| 7,126,463 B2 | 10/2006 | Bauerle et al. | 340/453 |
| 7,279,855 B2 | 10/2007 | Tahara et al. | 318/46 |
| 7,327,222 B2 * | 2/2008 | Peltonen | 340/12.32 |
| 7,369,629 B2 | 5/2008 | Umewaka | 375/334 |
| 7,583,734 B2 * | 9/2009 | Nakashima et al. | 375/257 |
| 8,058,750 B2 * | 11/2011 | Covaro et al. | 307/125 |
| 2003/0043038 A1 | 3/2003 | Izadinia et al. | 340/568.2 |
| 2003/0090244 A1 | 5/2003 | Shenai et al. | 323/259 |
| 2005/0200317 A1 * | 9/2005 | Novikov | 315/312 |
| 2005/0231133 A1 | 10/2005 | Lys | 315/291 |
| 2006/0038661 A1 * | 2/2006 | Reinhold et al. | 340/310.11 |
| 2006/0049693 A1 | 3/2006 | Abraham et al. | 307/10.1 |
| 2006/0222089 A1 | 10/2006 | Dicky | 375/259 |
| 2006/0284728 A1 * | 12/2006 | Rubinstein et al. | 340/310.12 |
| 2006/0290210 A1 * | 12/2006 | Foard | 307/147 |
| 2007/0014304 A1 | 1/2007 | Wu et al. | 370/431 |
| 2007/0143508 A1 | 6/2007 | Linnman | 710/100 |
| 2007/0286305 A1 | 12/2007 | Saggini et al. | 375/272 |
| 2008/0218148 A1 * | 9/2008 | Robertson et al. | 323/349 |
| 2008/0224536 A1 * | 9/2008 | Yamazaki | 307/1 |
| 2009/0086487 A1 | 4/2009 | Ruud et al. | 362/249.02 |
| 2010/0138363 A1 | 6/2010 | Batterberry et al. | 705/412 |
| 2010/0214082 A1 * | 8/2010 | Covaro et al. | 340/310.12 |
| 2010/0237695 A1 | 9/2010 | Covaro et al. | 307/19 |
| 2010/0289343 A1 * | 11/2010 | Covaro et al. | 307/149 |

FOREIGN PATENT DOCUMENTS

| | | |
|---|---|---|
| JP | 60-140950 | 7/1985 |
| WO | WO 99/67880 | 12/1999 |

OTHER PUBLICATIONS

U.S. Appl. No. 12/389,868, filed Feb. 20, 2009, Covaro et al.
U.S. Appl. No. 12/465,800, filed May 14, 2009, Covaro et al.
IRPLLED1 350mA to 1.5A High Voltage LED Driver using IRS2540, IRF, www.irf.com, downloaded Feb. 17, 2009, pp. 1-29.
Pulse-width Modulation, Wikipedia, http://en.wikipedia.org/wiki/Pulse_width_modulation, dated Feb. 2009, pp. 1-6.
Duty Cycle, Wikipedia, http://en.wikipedia.org/wiki/Duty_cycle, dated Jan. 8, 2009, pp. 1-2.
Stefanutti, W., Mattavelli, P., Saggini, S., Panseri, L. Communication on Power Lines Using Frequency and Duty-Cycle Modulation in Digitally Controlled dc-dc Converters, IEEE, 2006, pp. 2144-2149.
Saggini, S., Stefanutti, W., Mattavelli, P., Garcea, G., Gihoni, M., Power Line Communication in dc-dc Converters Using Switching Frequency Modulation, IEEE, 2006, pp. 1595-1600.
Stephens, W.E., Banwell, T.C., Lalk, G.R., Robe, T.J., Young, K.C., Transmission of STS-3c (155 Mbit/sec) SONET/ATM Signals Over Unshielded and Shielded Twisted Pair Copper Wire, IEEE, 1992, pp. 170-174.
Aghajeri, S., Shafiee, H., Synchronization in OFDM Powerline Communication Systems in Presence of Narrowband Interferences, IEEE, 2003, pp. 359-362.
Santolaria, A., Balcells, J., González, D., Gago, J., Evaluation of Switching Frequency Modulation in EMI Emissions Reduction Applied to Power Converters, IEEE, 2003, pp. 2306-2311.
Schur, Romed, Speidel, Joachim, Angerbauer, Ralf, Reduction of Guard Interval by Impulse Compression for DMT Modulation on Twisted Pair Cables, IEEE, 2000, pp. 1632-1636.
Barton, Melbourne, Honig, Michael L., Optimization of Discrete Multitone to Maintain Spectrum Compatibility with Other Transmission Systems on Twisted Copper Pairs, IEEE, 1995, pp. 1558-1563.
Linear Regulator, Wikipedia, www.wikipedia.org, Feb. 5, 2009, pp. 1-5.
X10 (industry standard), Wikipedia, www.wikipedia.org, dated Oct. 4, 2007, pp. 1-7.
Office Action, dated Apr. 26, 2011, pp. 1-24, U.S. Appl. No. 12/465,800, U.S. Patent and Trademark Office, Virginia.
Bi-Level Lighting Control Credits, dated Jun. 27, 2002, pp. 1-15, Pacific Gas and Electric Company, available at www.energy.ca.gov.
Flourescent Ballasts—Dimming, downloaded Mar. 9, 2010, p. 1, Koninklijke Philips Lighting Electronics, The Netherlands, available at www.advance.philips.com.
Mark 7® 0-10 Volt, downloaded Mar. 9, 2010, pp. 1-2, Koninklijke Philips Lighting Electronics, The Netherlands, available at www.advance.philips.com.
Quicktronic Powersense® T8 Dimming Universal Voltage, downloaded Mar. 9, 2010, pp. 1-2, Osram Sylvania, available at www.sylvania.com.
Dimming & Dali Ballasts, downloaded Mar. 9, 2010, pp. 1-2, Osram Sylvania, available at www.sylvania.com.
Notice of Allowance, dated Sep. 28, 2011, pp. 1-9, U.S. Appl. No. 12/465,800, U.S. Patent and Trademark Office, Virginia.

* cited by examiner

DIGITAL SWITCH COMMUNICATION

This application claims priority under 35 U.S.C. §120 to U.S. patent application Ser. No. 12/389,868, entitled "TRANSMISSION OF POWER AND DATA WITH FREQUENCY MODULATION" filed Feb. 20, 2009, the entire contents of which are hereby incorporated herein by reference.

TECHNICAL FIELD

The present disclosure relates generally to communication and, in particular, to communication and power transmission.

BACKGROUND

Twisted pair wiring is a form of wiring in which two conductors are wound together for the purposes of canceling out electromagnetic interference (EMI) from external sources and crosstalk between neighboring pairs. The two conductors may represent a line. Twisted pair wiring is the primary wire type for land-line telephone usage.

Ethernet over twisted pair typically includes four or more lines of twisted pair wiring. Each one of the lines contains two conductors wound together. In some examples, networked devices connected to Ethernet over twisted pair have been configured to receive data over a first one of the lines and to receive power over a second one of the lines.

BRIEF SUMMARY

By way of introduction, the aspects described below include an apparatus, a system, and a method to communicate data over a line by altering the resistance on a line while a power signal on the line powers a load device.

According to a first aspect, an electric circuit may be provided for communicating over a line that the electric circuit is electrically coupled to. The electric circuit may include a switch electrically coupled in series with a load, where the switch and the load are in series between two conductors. The two conductors may include the line. The line may provide power to the load. The electric circuit may also include a resistive element that is electrically coupled in parallel with the switch and is in series with the load. The switch may be configured to short circuit the resistive element when closed such that the voltage on the line varies between two voltage levels when the switch is opened and closed. The voltage on the line may be an electric potential difference between the two conductors. The line provides power to the load when the switch is opened and when the switch is closed.

According to a second aspect, a system is provided. The system may include a power device electrically coupled to a line and configured to generate a power signal over the line. The system may also include a power communicator in communication with the power device. The power communicator may be configured to receive data in a form of variations of voltage on the line caused from a variation of resistance on the line during generation of the power signal. The power signal may power a load device during the variations of voltage on the line, where the load device is electrically coupled to the line.

In a third aspect, a method is provided. A power signal may be received on a line at a load device. The load device may be powered from the power signal when a voltage on the line is at a first voltage level and a second voltage level. The voltage on the line may be an electric potential difference between first and second conductors, where the first conductor and the second conductor include the line. Data may be transmitted over the line by alternating the voltage on the line between the first voltage level and the second voltage level. Alternating the voltage on the line may include switching a resistive element in and out of a current path that passes from the first conductor to the second conductor through the load device.

The present invention is defined by the following claims, and nothing in this section should be taken as a limitation on those claims. Further aspects and advantages of the invention are discussed below in conjunction with the example embodiments.

BRIEF DESCRIPTION OF THE DRAWINGS

The components and the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
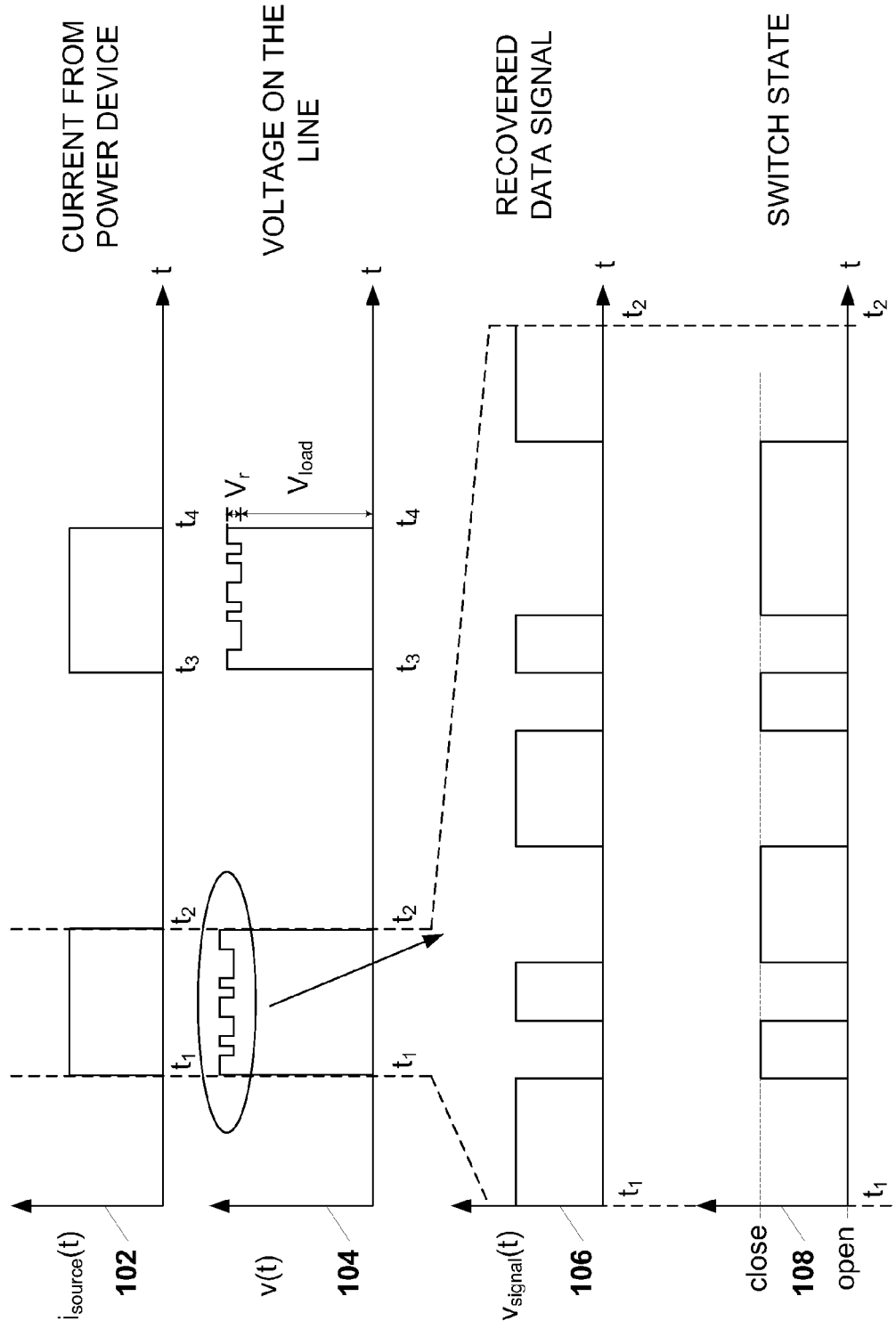
FIG. 1 illustrates example waveforms in a system to transmit data with a switch circuit.

Twisted pair wiring that includes two conductors may be less expensive than many other types of cabling, such as Ethernet cabling and 10 AWG (American wire gauge) building wiring. A single line that includes two conductors may carry both power and data between a control system and a load device, costing less than a configuration that includes a line with two conductors for the power and a different line with two conductors for the data. The control system may generate a power signal to power the load device over the single line. Alternatively or additionally, the control system may transmit both power and data to the load device over the single line by, for example, varying the frequency of a pulse-width modulated power signal that powers the load device. The load device may transmit data to the control system over the single line by selectively switching a resistive element in and out of a current path that passes through the load device and the conductors of the single line. By selectively switching the resistive element in and out of the current path, the load device may vary the voltage on the line by, for example, the voltage across the resistive element. The control system may detect the variations in the voltage on the line. Thus, communication between the control system and the load device may be half-duplex or full-duplex. More than one line may connect the power and load devices.

By way of example, the load device may be a light-emitting diode (LED) fixture to provide lighting in a building. The control system may be a panel that controls and/or powers lighting in the building. The LED fixture may be connected to the panel with twisted-pair wiring. The panel may transmit a request to the LED fixture for an identification of the type of load device while providing a low power signal to power at least a load communicator circuit in the LED fixture. In response, the load communicator circuit in the LED fixture may transmit a response indicating that the load device is the LED fixture. Thereafter, the panel may selectively transmit a higher power signal to the LED fixture in order to provide power for operation of the LED fixture. The higher power signal and/or the control data transmitted to the LED fixture may switch the LED fixture on and illuminate the light-emitting diode(s) therein. Additionally or alternatively, the panel may vary the power signal or provide control data to the LED fixture to control the brightness of the LED fixture. In one example, the panel may be electrically coupled to a sensor over a second line of twisted-pair wiring. The panel may read data from the sensor, which is located near the LED fixture, over the second line of twisted-pair wiring. Alternatively or in addition, the sensor may be co-located with the LED fixture and share the same data path, i.e., the same twisted-pair wiring, as the LED fixture. For example, the sensor may transmit data indicative of the light level sensed near the LED fixture. Alternatively or in addition, the panel may send data to the sensor over the second twisted-pair wiring to adjust the sensor response.

The load device may selectively switch a resistive element in and out of a current path using a switch circuit. For example, the switch circuit may include a switch connected in parallel with the resistive element, such that the when the switch is on, the current flows through the switch and shorts the resistive element. When the switch is off, the current may flow through the resistive element and create a voltage drop across the resistive element. In one example, the switch may include a transistor and the resistive element may include a resistor.

FIG. 1 illustrates example waveforms in a system to transmit data with the switch circuit, such as transmitting data from the load device to the control system and transmitting data from the load device to other load devices. The example waveforms are illustrative. The characteristics of the waveforms, such as period, amplitude, frequency, and timing relative to each other, may be different in different examples.

A first waveform 102 illustrates the current, $i_{source}(t)$, of a direct current (DC) power signal generated by the control system. DC is unidirectional flow of electric charge. In the example illustrated in FIG. 1, the DC power signal is a pulse wave generating a constant current level during a time period from $t_1$ to $t_2$ and during other time periods, such as from $t_3$ to $t_4$.

A second waveform 104 illustrates voltage, v(t), on the line between the load and controller. During the time periods from $t_1$ to $t_2$ and from $t_3$ to $t_4$, the voltage may alternate between $V_{load}$ and $V_{load}+V_r$, where $V_r$ is the voltage drop across the resistive element and $V_{load}$ is the voltage drop across the load device with the switch closed, shorting the resistive element. In one example, $V_r$ may be selected to be substantially less than $V_{load}$ to minimize power lost during the transmission of data. For example, $V_r$ may be 10 percent or less of $V_{load}$.

A third waveform 106 illustrates the recovered signal in the control system. The recovered signal may be a digital signal that is high when the voltage on the line is $V_{load}+V_r$ and low when the voltage on the line is $V_{load}$. In a different example, the recovered signal may be a digital signal that is low when the voltage on the line is $V_{load}+V_r$ and high when the voltage on the line is $V_{load}$. The recovered signal may represent the data transmitted from the load device. For example, when the recovered signal is high, the recovered signal may represent a binary value of one, and when the recovered signal is low, the recovered signal may represent a binary value of zero. Alternatively or in addition, when the recovered signal is high, the recovered signal may represent a binary value of zero, and when the recovered signal is low, the recovered signal may represent a binary value of one.

A fourth waveform 108 illustrates the state of the switch over time. In the example illustrated in FIG. 1, when the switch is on, the recovered signal is low; and when the switch is off, the recovered signal is high. In a different example, when the switch is on, the recovered signal may be high; and when the switch is off, the recovered signal may be low.

Figure 2:
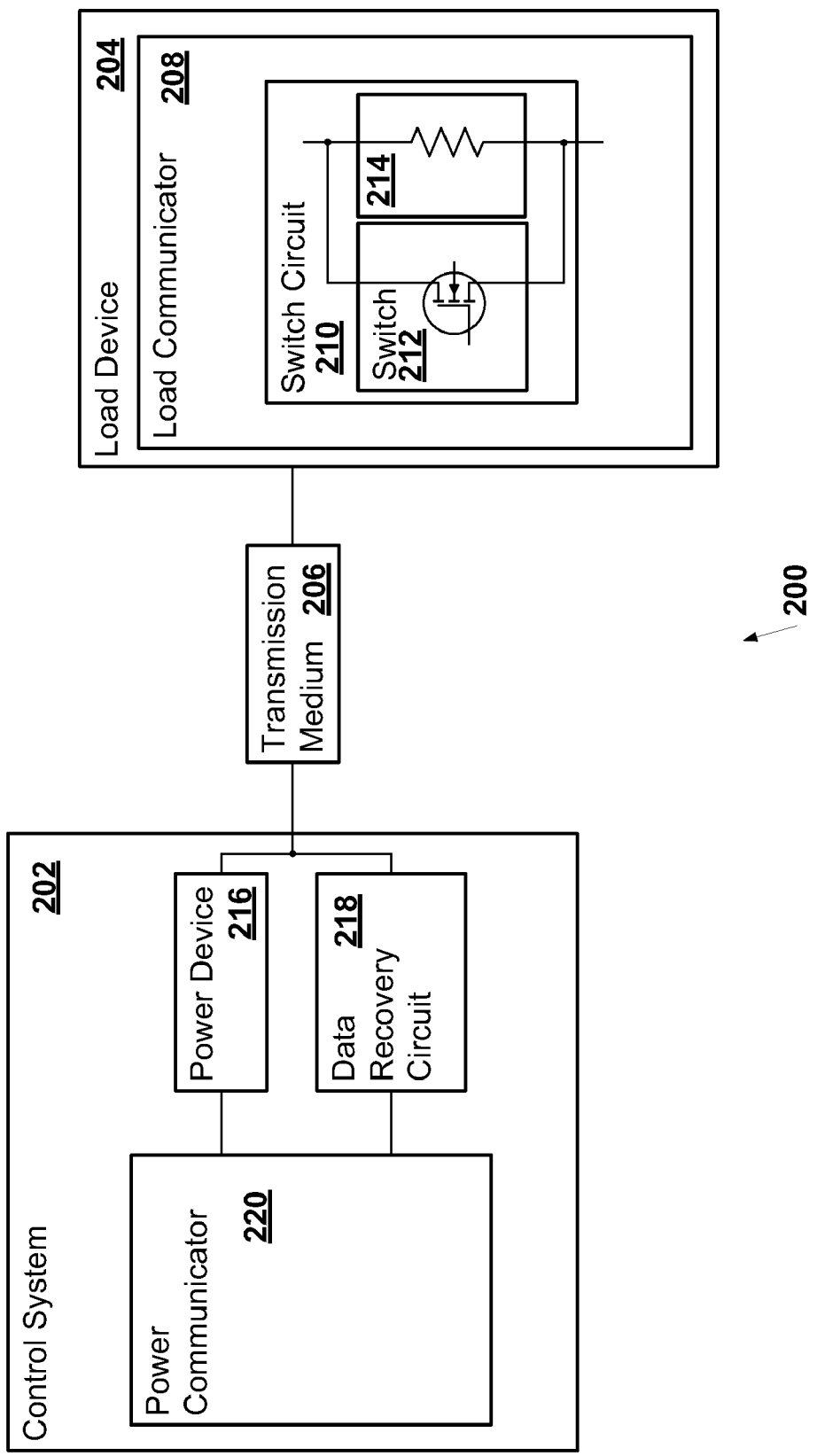
FIG. 2 illustrates an example system for communicating data with a switch circuit.

FIG. 2 illustrates an example system 200 for communicating data with a switch circuit 210. The system 200 may include a control system 202 and a load device 204. The control system 202 may be in communication with the load device 204 over a transmission medium 206. The system 200 may include additional, different, or fewer components. For example, the system 200 may just or only include the load device 204. Alternatively or in addition, the system 200 may include additional load devices.

The transmission medium 206 may include any wiring or combination of wiring suitable for propagating an electric signal. The transmission medium 206 may also include a repeater device, a wireless transceiver, any other device or material operable to propagate an electromagnetic signal, or any combination thereof. Examples of the transmission medium 206 include, but are not limited to, twisted pair wiring, coaxial cabling, Ethernet cabling, 10 AWG (American wire gauge) building wiring. The transmission medium 206 may include two conductors that represent a single line. Alternatively or in addition, the transmission medium 206 may include multiple lines, where each of the lines includes at least two conductors. The transmission medium 206 may be a single conductor that is a single line, when the control system 202 and the load device 204 use a common system ground.

The load device 204 may be any device that may be powered at least in part by a power signal received over the transmission medium 206. Examples of the load device 204 include a LED, a LED fixture, a switch, a network device, a LCD (Liquid Crystal Display) touch screen, a dimmer control, a motion detector, a photosensor, a brightness sensor, and any other device or combination of devices suitable to receive power from the control system 202.

In one example, the load device 204 may include a load communicator 208. The load communicator 208 may be any circuit, device, or combination of devices that may communicate over the transmission medium 206. The load communicator 208 may be configured to transmit data over the transmission medium 206. Alternatively or in addition, the load communicator 208 may receive data over the transmission medium 206. In a second example, the load device 204 may not include the load communicator 208—instead, the load device 204 may be in communication with the load communicator 208.

The load communicator 208 may include the switch circuit 210, which may include a switch 212 and a resistive element 214. In a second example, the load device 204, instead of the load communicator 208, may include the switch circuit 210. In still another example, the switch 212 and the resistive element 214 may be separated and included in the load communicator 208 and the load device 204, respectively. Examples of the load communicator 208 are provided below in reference to FIGS. 3-5.

The control system 202 may be any device or combination of devices that may generate a power signal to power the load device 204, communicate with the load communicator 208, or both. The control system 202 may be configured to receive data transmitted by the load communicator 208 over the transmission medium 206. Alternatively or in addition, the control system 202 may be configured to transmit data to the load communicator 208 over the transmission medium 206. An example of the control system 202 may include a panel that controls LED fixtures in a building.

The control system 202 may include a power device 216, a data recovery circuit 218, and a power communicator 220. The control system 202 may include additional, fewer, or different components. For example, the control system 202 may include just the data recovery circuit 218. In a different example, the control system 202 may include just the power communicator 220. The power communicator 220 may be in communication with the power device 216 and the data recovery circuit 218. In one example, the power device 216 and the data recovery circuit 218 may be electrically coupled to the transmission medium 206. In a second example, the power device 216 may be electrically coupled to the transmission medium 206, and the data recovery circuit 218 may be electrically coupled to the power device 216.

The power device 216 is an electrical component that may include any power source that generates a power signal. Examples of the power device 216 include a switched-mode power supply, an AC to DC (Alternating Current to Direct Current) converter, a DC to DC (Direct Current to Direct Current) converter, a fixed-frequency PWM converter, a variable-frequency quasi-resonant ZCS/ZVS (Zero-Current Switching/Zero-Voltage Switching) converter, a voltage converter, a current converter, a hysteretic converter, and a PWM buck converter. Other power sources may be used.

The power signal may be any type of DC signal, such as a pulse wave, a square wave, a rectangular wave, a constant, zero-frequency current, any other type of DC signal with a determined voltage and/or current level for at least a period time, or any combination thereof. One example of the power signal is the first waveform 102 illustrated in FIG. 1. Direct current may be used as a relatively stable current in comparison to the communication rate.

The data recovery circuit 218 includes any circuit that may generate a data signal from the voltage, v(t), on the transmission medium 206, where the data signal represents data transmitted by the load communicator 208. For example, the data signal may be a binary signal, which alternates between two states over time. The two states may be referred to as a "low state" and a "high state," or "on" and "off." In a different example the data signal may not be a binary signal. One example of the voltage, v(t), detected on the line is the second waveform 104 illustrated in FIG. 1. One example of the data signal is the third waveform 106 illustrated in FIG. 1. Examples of the data recovery circuit 218 are described below in reference to FIG. 6.

The power communicator 220 may be any circuit that receives the data transmitted by the load device 204 over the transmission medium 206. For example, the power communicator 220 may receive data indicating that the load device 204 is an LED fixture. Thereafter, the power communicator 220 may communicate with the power device 216 to generate a power signal to the LED fixture that provides adequate power to operate the LED fixture.

Alternatively or in addition, the power communicator 220 may be any circuit that transmits data to the load device 204 over the transmission medium 206. The power communicator 220 may use any mechanism of transmitting data now known or later discovered. The power communicator 220 may generate a waveform that the power device 216 amplifies for transmission over the transmission medium 206. An example of a mechanism of transmitting data over the transmission medium 206 using frequency-shift keying modulation is described in more detail below.

In one example, the power communicator 220 may facilitate receipt and/or transmission of data. For example, the power communicator 220 may uncompress data received from the load device 204 and/or compress data transmitted using a suitable algorithm. In a second example, the power communicator 220 may relay information received over the transmission medium 206 to a network (not shown). Additionally or alternatively, the power communicator 220 may relay information received over the network to the transmission medium 206. In a third example, the power communicator 220 may implement any communication protocol now known or later discovered when communicating with the load device 204. Examples of the power communicator 220 are described in detail below in reference to FIG. 6.

Figure 3:
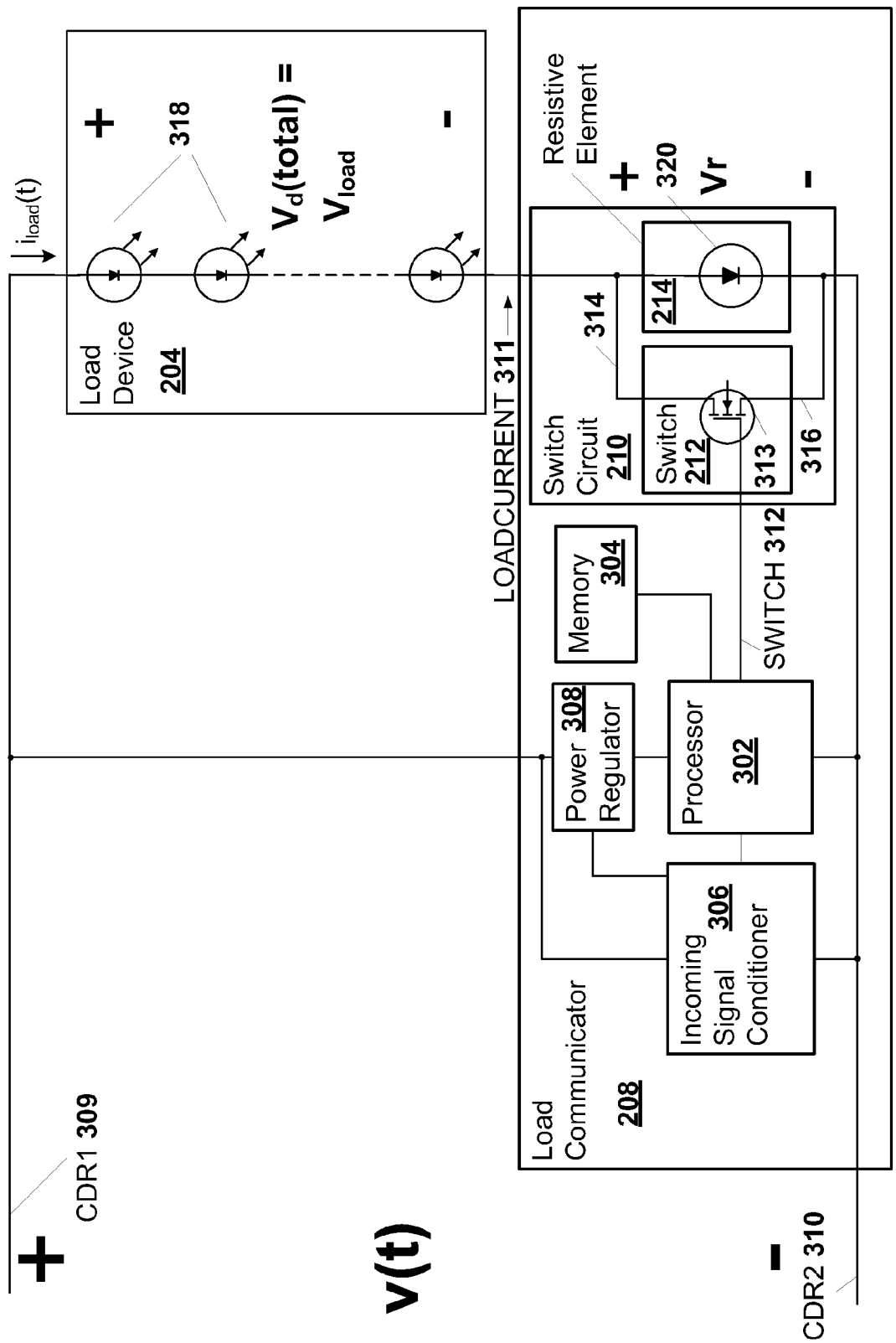
FIG. 3 illustrates a first example of a load communicator.

FIG. 3 illustrates a first example of load communicator 208. The load communicator 208 may include a processor 302, a memory 304, an incoming signal conditioner 306, a power regulator 308, and the switch circuit 210. The load communicator 208 may include additional, fewer, or different components. For example, the load communicator 208 may not include the power regulator 308.

The load communicator 208 may be electrically coupled to two conductors, individually designated CDR1 and CDR2, 309 and 310, respectively. The two conductors, CDR1 and CDR2, may be the two conductors of a single line included in the transmission medium 206. In the example illustrated in FIG. 3, the load communicator 208 is electrically coupled to a node designated LOADCURRENT 311. The current that passes through the load device 204 between CDR1 and CDR2 also flows through a LOADCURRENT node 311. In a different example, the load communicator 208 is not electrically coupled to the LOADCURRENT node 311. The processor 302 may be in communication with the memory 304, the incoming signal conditioner 306, the power regulator 308 and the switch circuit 210. The processor 302 may be in communication with fewer, additional, or different components. For example, the processor 302 may be in communication with the load device 204.

The power regulator 308 may be any circuit configured to store power received on the line and generate a regulated DC power signal. The regulated DC power signal may power the load communicator 208. Examples of the power regulator 308 are described below in connection with FIG. 10.

The memory 304 may be any now known, or later discovered, data storage device. The memory 304 may be a non-volatile and/or volatile memory, such as a random access memory (RAM), a read-only memory (ROM), an erasable programmable read-only memory (EPROM), or flash memory. The memory 304 may include an optical, magnetic (hard-drive) or any other form of data storage device.

The processor 302 may be a general processor, central processing unit, server, application specific integrated circuit (ASIC), digital signal processor, field programmable gate array (FPGA), digital circuit, analog circuit, or combinations thereof. The processor 302 may be one or more devices operable to execute computer executable instructions or computer code embodied in the memory 304 or in other memory to communicate over the transmission medium 206.

The incoming signal conditioner 306 may include any circuit configured to extract a data signal from the signal received from the transmission medium 206. As described in more detail below, the particular configuration of the circuit in the incoming signal conditioner 306 depends on the mechanism of transmitting data used by the power communicator 220.

The switch circuit 210 may be any circuit configured to modify the resistance of a current path that includes a path through the load device 204. The switch circuit 210 may be configured so that the current flowing through the load device 204 between the two conductors of the line, CDR1 and CDR2, respectively, also flows through the switch circuit 210. In other words, the switch circuit 210 and the load device 204 may be electrically coupled in series. For example, the switch circuit 210 may be electrically coupled to LOADCURRENT node 311 and at least one of CDR1 and CDR2.

The switch 212 may include a transistor 313 or any other component that is configured to selectively couple or decouple a first node 314 and a second node 316 of the switch 212 based on an open/close signal received at a third node of the switch 212. The third node of the switch 212 receives the open/close signal designated SWITCH 312 in FIG. 3. Current may flow through the switch 212 when the switch 212 is closed. Current through the switch 212 may be blocked or substantially limited when the switch is open 212. Examples of the switch 212 include a metal-oxide-semiconductor field-effect transistor (MOSFET), an insulated gate field effect transistor (IGFET), a bipolar transistor, a PNP bipolar junction transistor, and an NPN bipolar junction transistor. Additionally or alternatively, the switch 212 may include one or more additional components, such as a diode.

In one example, the first and second nodes 314 and 316 of the switch 212 may be electrically coupled to LOADCURRENT node 311 and CDR2, respectively. In a second example, the first two nodes 314 and 316 of the switch 212 may be electrically coupled to LOADCURRENT node 311 and CDR1, respectively.

The resistive element 214 may include any electrical component that generates a voltage difference, $V_r$, as current flows from a first end of the resistive element 214 to a second end. The resistance of the resistive element 214 may vary based on the current level through the resistive element 214 such that the voltage drop across the resistive element 214 is substantially independent of the current level. Examples of the resistive element 214 include a resistor, a diode, a light-emitting diode, a precision shunt voltage reference, a Zener diode, any other electronic component having an electrical resistance, and any combination thereof. The precision shunt voltage reference may be an integrated circuit that behaves like a Zener diode but uses a band gap reference for accuracy.

During operation, current, $i_{load}(t)$ may flow through the load device 204. In the example illustrated in FIG. 3, the load device 204 is a LED fixture. When the load device is a LED fixture, the load device 204 may include light-emitting diodes (LEDs) 318 connected in series and powered by $i_{load}(t)$. Each one of the LEDs 318 may have a diode forward voltage drop, $V_d$. When the voltage across one of the diodes reaches $V_d$, the current may begin to flow through the diode. If more current flows through one of the diodes, then the voltage across the diode may remain about $V_d$. Connected in series, the LEDs may have a total diode forward voltage drop of $V_d$(total). The total diode forward voltage drop, $V_d$(total), may equal the diode forward voltage drop, $V_d$, if the load device 204 includes just one LED. Examples of the total diode forward voltage drop, $V_d$(total), include 3 volts, 5 volts, 12 volts, and 60 volts. The LEDs 318 may illuminate when the voltage across each one of the LEDs 318 reaches $V_d$. Accordingly, $V_{load}$ may be $V_d$(total) in the example illustrated in FIG. 3 when the LED fixture is illuminated-even if the current, $i_{load}(t)$, varies.

The processor 302 may transmit data by changing the state of the switch 212. For example, the processor 302 may transmit a binary signal such as the fourth example waveform 108 illustrated in FIG. 1 to the switch circuit 210. Referring back to FIG. 3, the processor 302 may transmit data by transmitting the open/close signal, designated SWITCH 312, to the switch circuit 210.

When the switch 212 is open, $i_{load}(t)$ may flow through the resistive element 214. In one example, when $i_{load}(t)$ remains at a constant, non-zero current, I, for a determined time period, then the voltage across the resistive element 214 may be a constant $V_r$. For example, if the resistive element 214 is a resistor having a resistance R, then $V_r=I*R$. In a second example, even if $i_{load}(t)$ varies during a determined time period, then the voltage across the resistive element 214 may be a constant $V_r$. For example, if the resistive element 214 is a silicon diode 320 as illustrated in FIG. 3, then $V_r$ may be the diode forward voltage drop of the silicon diode 320. Accordingly, when the switch 212 is open, the voltage on line, v(t) during the determined time period may be $V_{load}+V_r$.

When the switch 212 is closed, $i_{load}(t)$ may flow through the switch 212 instead of through the resistive element 214. The voltage drop across the switch 212 when the switch 212 is closed may be negligible because the resistance of the switch 212 may be very small: for example, less than 100 milliohms. Consequently, when the switch 212 is closed, the resistive element 214 is shorted. Accordingly, when the switch 212 is closed, the voltage on the line, v(t) may be $V_{load}$.

By transmitting the open/close signal SWITCH 312, to the switch circuit 210, the processor 302 may open and close the switch 212, and thereby vary the voltage on the line, v(t), between $V_{load}$ and $V_{load}+V_r$. The data recovery circuit 218 in the control system 202 may detect the variation of the voltage on the line, v(t), between $V_{load}$ and $V_{load}+V_r$. As described in more detail below, by detecting the variations in the line voltage, v(t), the data recovery circuit 218 may generate a recovered data signal that matches or corresponds to the open/close signal SWITCH 312.

The resistance of the resistive element 214 may be adjusted depending on the sensitivity and noise tolerance of the data recovery circuit 218. The higher the resistance, the larger $V_r$. The larger $V_r$, the larger the difference between $V_{load}+V_r$ and $V_{load}$. The larger the difference between $V_{load}+V_r$ and $V_{load}$, the less sensitive the data recovery circuit 218 may be in order to accurately recover the data signal transmitted by the load communicator 208. In one example, the processor 302 may adjust the resistance of the resistive element 214 through communication with the resistive element 214. In a second example, multiple switch circuits similar to the switch circuit 210 may be connected in series, where the resistive element 214 in each of the multiple switch circuits may have a different resistance than the other switch circuits. In the second example, the processor 302 may transmit the open/close signal SWITCH 312 to the switch circuit 210 or combination of switch circuits 210 that include the resistive element(s) 214 having a desired resistance. In a third example, multiple switch circuits similar to the switch circuit 210 may be connected in parallel. In the third example, the processor 302 may transmit the open/close signal SWITCH 312 to one or more of the multiple switch circuits to control the voltage drop across the switch circuits.

The larger the voltage across the resistive element 214, $V_r$, the more power is lost in the resistive element 214. Consequently, configuring the resistive element 214 to have a lower resistance may be desirable to conserve power. In one example, $V_r$ may be adjusted to less than a tenth of $V_{load}$. Alternatively or in addition, $V_r$ may be adjusted and/or selected such that $V_r$ is high enough to accurately recover the data signal. For example, $V_r$ may be one volt or less.

The processor 302 may communicate the data received and/or transmitted by the load communicator 208 using any now known or later developed communication protocol. For example, where multiple load communicators are electrically coupled to the same conductors, CDR1 309 and CDR2 310, each of the load communicators may use any CSMA (Carrier Sense Multiple Access) protocol to communicate using the switch circuit 210. A CSMA protocol is a probabilistic Media Access Control (MAC) protocol in which a node participating in the protocol verifies the absence of other traffic before transmitting on a shared transmission medium, such as the transmission medium 206. Additionally or alternatively, the processor 302 may compress data to be transmitted before generating the open/close signal SWITCH 312 and decompress data received from the signal generated by the incoming signal conditioner 306.

Figure 4:
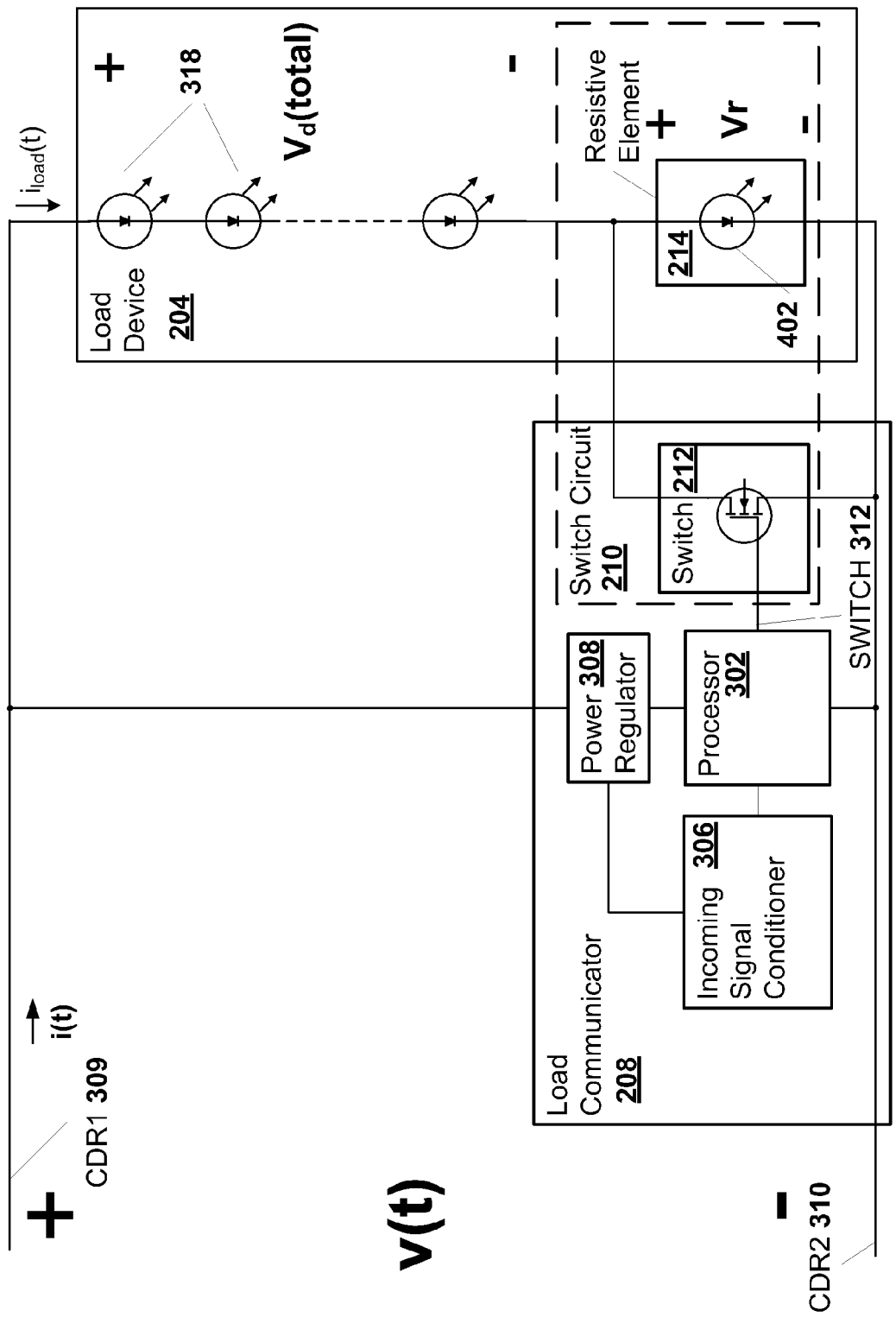
FIG. 4 illustrates a second example of a load communicator.

FIG. 4 illustrates a second example of the load communicator 208. In the example illustrated in FIG. 4, the switch 212 and the resistive element 214 of the switch circuit 210 are separated into two devices, the load device 204 and the load communicator 208, respectively. The separation may facilitate making use of the power dissipated in the resistive element 214. In the example illustrated in FIG. 4, the resistive element 214 includes an LED 402 included among the LEDs 318 of the load device 204. Therefore, the power dissipated in the LED 402 is substantially transformed into light energy. In a different example, the load device 204 may include the switch 212 and the resistive element 214 of the switch circuit 210, and the load communicator 208 may transmit the open/close signal SWITCH 312 to the load device 204.

Figure 5:
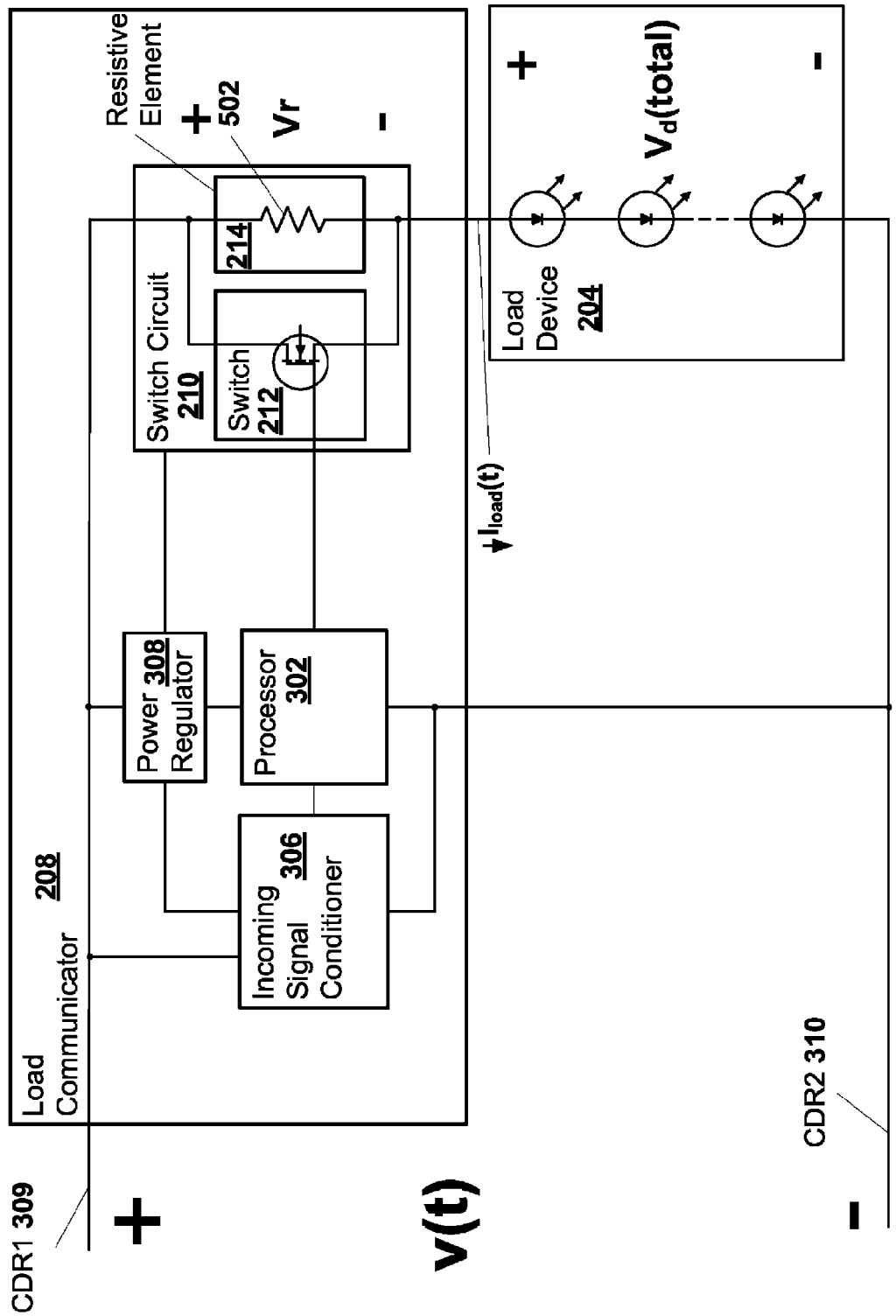
FIG. 5 illustrates a third example of a load communicator.

FIG. 5 illustrates a third example of the load communicator 208. The resistive element 214 may include a resistor 502. The current, $i_{load}(t)$ flowing from CDR1 to CDR2 may pass through the switch circuit 210 before passing through the load device 204.

Figure 6:
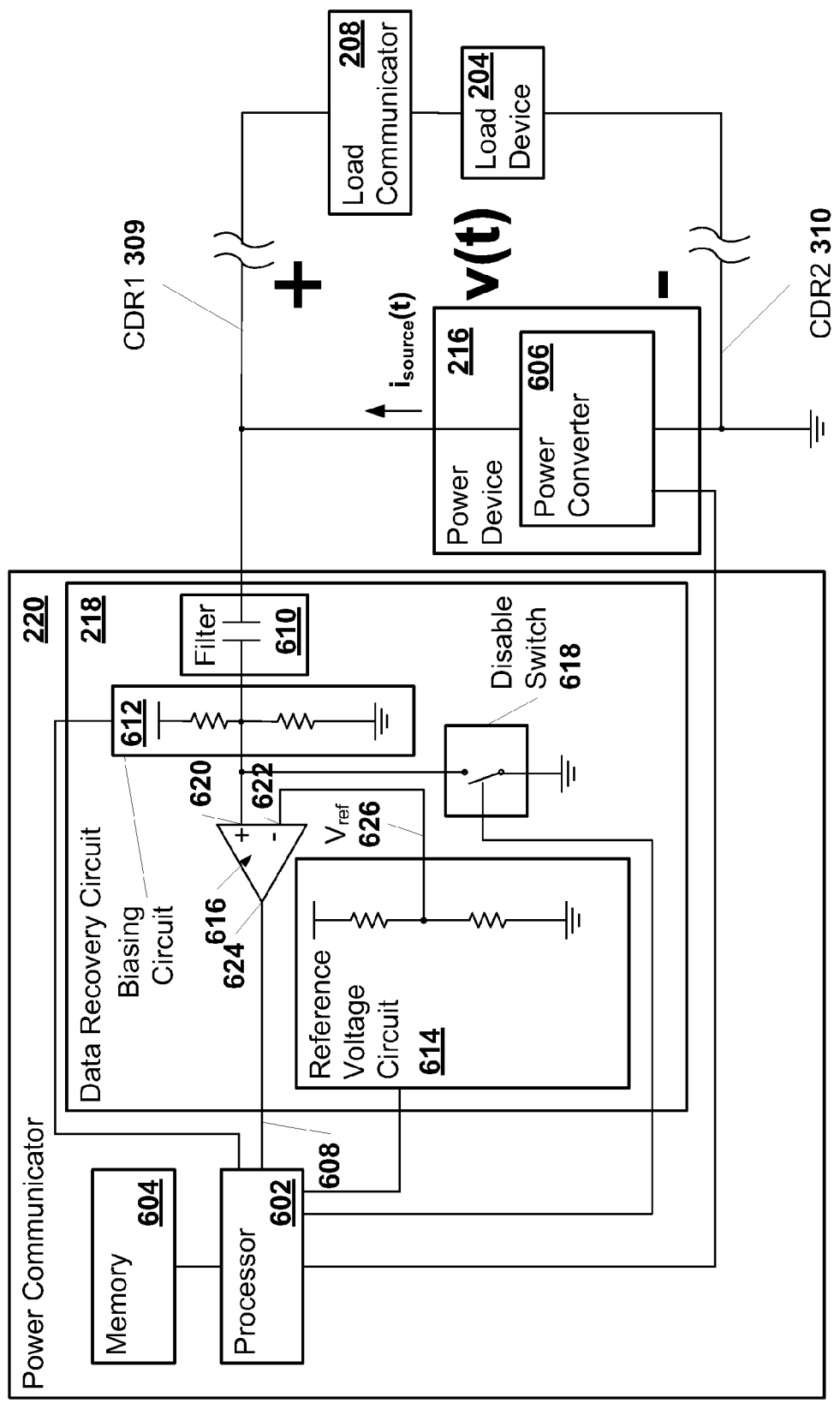
FIG. 6 illustrates an example of a power communicator that includes a data recovery circuit.

FIG. 6 illustrates an example of the power communicator 220 that includes the data recovery circuit 218. The power communicator 220 may be electrically coupled to the two conductors, individually designated CDR1 and CDR2, 309 and 310, respectively, in FIG. 6. Alternatively or in addition, one of the conductors, such as CDR2, may be a system ground. The two conductors, CDR1 and CDR2, may be the two conductors of the single line included in the transmission medium 206. The power communicator 220 may be in communication with the power device 216 to control the current, $i_{source}(t)$, generated by the power device 216. For example, the power device 216 may include a power converter 606 to generate the current, $i_{source}(t)$. The power communicator 220 may be in communication with the data recovery circuit 218. The power communicator 220 may include a processor 602 and a memory 604, such as the processor 302 and the memory 304 in the load communicator 208.

The data recovery circuit 218 may generate the data signal 608 from the line voltage, v(t), using any number of mechanisms. In a first example, the data recovery circuit 218 may use a high voltage instrumentation amplifier that accepts high voltages, which may be on the transmission medium 206. In a second example, the data recovery circuit 218 may use an analog-to-digital converter to generate a digitized signal that the processor 602 digitally processes to detect the variations of the voltage on the line, v(t), between $V_{load}+V_r$ and $V_{load}$. In the example illustrated in FIG. 6, the data recovery circuit 218 uses AC (alternating current) coupling and a suitable filter that passes frequencies in the ranges of the data signal.

The data recovery circuit 218 may include a filter 610, a biasing circuit 612, a reference voltage circuit 614, a comparator 616, and a disable switch 618. The data recovery 218 may include additional, fewer, or different components. For example, the data recovery circuit 218 may not include the disable switch 618. In a different example, an operational amplifier may be included instead of the comparator 616.

The filter 610 may be any filter configured to pass the frequencies of the data transmitted by the load communicator 208, but block lower and/or higher frequencies. For example, the filter 610 may include a capacitor. An input of the filter 610 may be electrically coupled to CDR1 to receive the line voltage, v(t). An output of the filter 610 may be electrically coupled to an input of the biasing circuit 612.

The biasing circuit 612 may be any circuit configured to set the operating point on a positive input node 620 of the comparator 616. The biasing circuit 612 compensates for the filter 610 blocking the zero frequency portion of the line voltage, v(t). The biasing circuit 612 may include a voltage divider that includes two resistors connected in series between a voltage source and ground. The input of the biasing circuit 612 may be electrically coupled to the node between the two resistors. The node between the two resistors may also be electrically coupled to an output of the biasing circuit 612. The output of the biasing circuit 612 may be electrically coupled to the positive input node 620 of the comparator 616.

The comparator 616 may be any circuit configured to compare a positive input voltage, $V_+$, on the positive input node 620 with a negative input voltage, $V_-$, on a negative input node 622 and generate an output voltage, $V_{out}$, on an output node 624 based on the comparison. In one example, $V_{out}=V_{high}*sgn(V_+-V_-)$, where $V_{high}$ is a voltage indicative of a high state, and when sgn is the sign function, such that sgn(x)=0 when x<=0 and sgn(x)=1 when x>0. In a second example, the output voltage may be the inverse of the output voltage in the first example. The output voltage, $V_{out}$, may be the recovered data signal 608. The negative input voltage, $V_-$, may be a reference voltage, $V_{ref}$, generated on an output node 626 of the reference voltage circuit 614.

The disable switch 618 may include a transistor or any other component that is configured to selectively couple or decouple a first node and a second node of the switch 618 based on an open/close signal received at a third node of the switch 618. The third node of the disable switch 618 may receive the open/close signal from the processor. Current may flow through the disable switch 618 when the disable switch 618 is closed. Current through the disable switch 618 may be blocked or substantially limited when the disable switch is open 618. Examples of the disable switch 618 include a metal-oxide-semiconductor field-effect transistor (MOSFET), an insulated gate field effect transistor (IGFET), a bipolar transistor, a PNP bipolar junction transistor, and an NPN bipolar junction transistor. The disable switch 618 may be configured to ground the positive input node 620 of the comparator 616.

The reference voltage circuit 614 may be any circuit configured to generate the reference voltage, $V_{ref}$. In one example, the reference voltage circuit 614 may include a precision voltage reference. Alternatively or in addition, the reference voltage circuit 614 may include a digital to analog converter controlled by the processor 602 to set the voltage reference. In the example illustrated in FIG. 6, the reference voltage circuit 614 includes a voltage divider circuit that includes two resistors connected in series between a voltage source and ground. The electrical potential at a node between the resistors may be the reference voltage, $V_{ref}$. The value of the reference voltage, $V_{ref}$, may be configured to be near the value of the operating point of the comparator 616.

One example of the digital to analog converter used to set $V_{ref}$ may include a digital-to-analog semiconductor device. The digital to analog semiconductor device may receive data in a wide clocked or latched data bus (8 bits for example) or a clocked serial bus. A second example of the digital to analog converter may include a pulse-width modulation to DC converter. A pulse-width modulation to dc converter will take in a pulse-width modulated stream of varying duty cycle and produce a DC voltage by filtering that pulse stream. Using the digital to analog converters as opposed to a fixed reference facilitates dynamic adjustment of $V_{ref}$ to optimize signal recovery.

During operation of the data recovery circuit 218, the power device 216 may start by generating a power signal, $i_{source}(t)$, without the load communicator 208 transmitting data. The filter 610 filters out the line voltage, v(t), leaving the positive input voltage, $V_+$, on the positive input node 620 equal to the operating point of the comparator 616. Consequently, when the comparator 616 compares the operating point with the reference voltage, $V_{ref}$, the comparator 616 may set the output voltage, $V_{out}$, on the output node 624 to zero. In a different example, the comparator 616 may set the output voltage, $V_{out}$, to $V_{high}$, instead of zero.

When the load communicator 208 opens the switch 212 in the switch circuit 210, the voltage on the line may increase by, for example, $V_r$. In response, the filter 610 may increase the voltage at the input node of the biasing circuit 612. Therefore, $V_+ - V_-$ may become a positive value, so that when the comparator 616 compares the positive input voltage, $V_+$, on the positive input node 620 with the reference voltage, $V_{ref}$, present on the negative input node 622, the comparator 616 may set the output voltage, $V_{out}$, on the output node 624 to $V_{high}$. In a different example, the comparator 616 may set the output voltage, $V_{out}$, to zero instead of $V_{high}$.

When the load communicator 208 closes the switch 212 in the switch circuit 210, the voltage on the line may decrease by, for example, $V_r$. In response, the filter 610 may decrease the voltage at the input node of the biasing circuit 612. Therefore, $V_+ - V_-$ may become zero or a negative value, so that when the comparator 616 compares the positive input voltage, $V_+$, on the positive input node 620 with the reference voltage, $V_{ref}$, present on the negative input node 622, the comparator 616 may set the output voltage, $V_{out}$, on the output node 624 back to zero (or $V_{high}$). Accordingly, as the load communicator 208 opens and closes the switch 212 in the switch circuit 210, the comparator 616 may alternate the output voltage, $V_{out}$, on the output node 624 between zero and $V_{high}$ in response. The output voltage the output node 624 of the comparator 616 may be a binary signal representing the data transmitted by the load communicator 208.

In one example, the processor 602 may dynamically set the operating point and/or the reference voltage, $V_{ref}$, in order to optimize data reception. If the difference $V_+ - V_-$ becomes too large when the load communicator 208 is not transmitting data, then the changes in the line voltage may not be properly reflected in the output voltage on the output node 624 of the comparator 616. In one example, the processor 602 may communicate with the biasing circuit 612 to dynamically set the operating point of the comparator 616. In a second example, the processor 602 may communicate with the reference voltage circuit 614 to dynamically set the reference voltage 626.

When the power device 216 is not generating current on the line, the processor 602 may close the disable switch 618. When the disable switch 618 is closed, the comparator 208 616 may be prevented from generating the recovered data signal 608 from the line voltage, v(t).

In one example, the control system 202 may transmit data to the load communicator 208 using frequency-shift keying. The control system 202 generates a signal to deliver power to the load device 204 and may control the amount of power delivered through pulse-width modulation (PWM) of the signal and/or through amplitude modulation of the signal. PWM of the signal may include the modulation of the duty cycle of the signal in order to vary the amount of power delivered. The duty cycle is the fraction of time that the signal is in an "active" state, which, for a periodic function, may be represented as:

$$\text{duty cycle } D = \tau/T$$

where τ is the duration that the function is non-zero and T is the period of the function. Alternatively or additionally, the amplitude of the pulse-width modulated signal may be varied to change the average amount of power delivered to the load device 204 while the duty cycle remains fixed.

The control system 202 may generate any type of pulse-width modulated signal, such as a pulse wave, a square wave, a rectangular wave, or a sinusoidal wave. The signal may be considered in an "active" state when the voltage or the current of the signal exceeds a determined threshold. In one example, pulse width modulation may be provided where the duty cycle is different than ½ or 0.5.

The control system 202 may transmit data to the load device using frequency modulation of the pulse-width modulated signal while maintaining a constant duty cycle. For example, the control system 202 may generate alternate waveforms, where each one of the waveforms has the same duty cycle, but each one of the waveforms has different frequencies.

Figure 7:
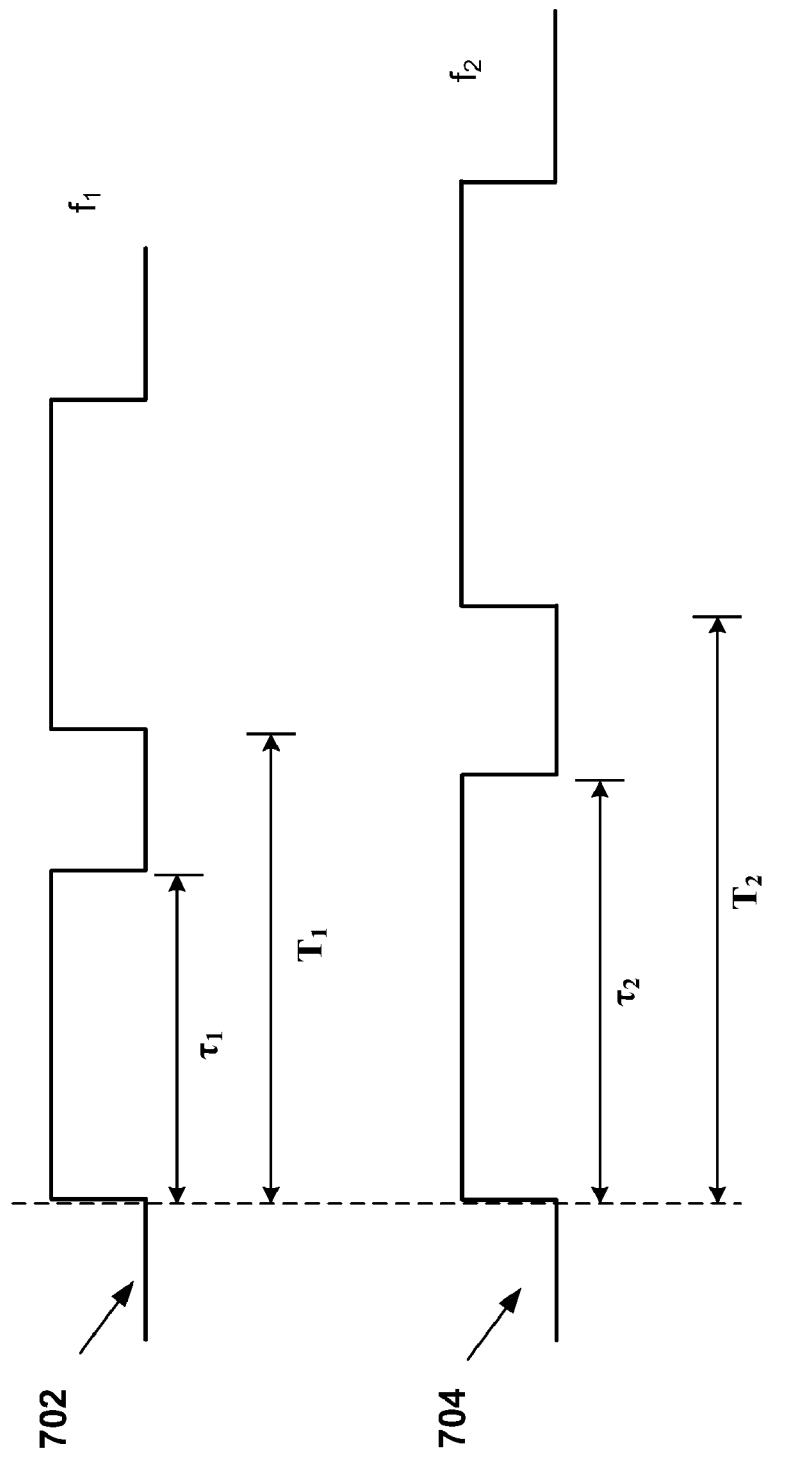
FIG. 7 illustrates one example of two different waveforms that a control system may generate to transmit data to a load communicator.

FIG. 7 illustrates one example of two different waveforms that the control system 202 may generate to transmit data to the load communicator 208. The two waveforms 702 and 704 both have the same duty cycle. Therefore, the control system 202 may transmit either one of the two different waveforms 702 and 704 and still deliver the same amount of power to the load device 204. Although both waveforms 702 and 704 have the same duty cycle, the frequencies of the two waveforms 702 and 704 are different from each other.

Consequently, the control system 202 may vary the frequency of the pulse-width modulated signal in order to transmit data to the load device 204 while keeping the duty cycle of the pulse-width modulated signal fixed. The variation in the frequency of the pulse-width modulated signal may be detected by the load device 204 while the load device 204 continues to receive a constant average amount of power from the control system 202. Each one of the two different waveforms 702 and 704 may represent one of two different states. For example, the first one of the waveforms 702 and 704 may represent a binary "0" and the second one of the waveforms 702 and 704 may represent a binary "1."

In a second example, the control system 202 may generate n number of distinct waveforms, where each one of the waveforms has the same duty cycle but a different frequency than the others. Each one of the distinct waveforms may correspond to a corresponding one of n possible states. Thus, for example, each one of the distinct waveforms may represent a binary encoded value. In such an example, the control system 202 is frequency-shift keying the pulse-width modulated signal. Frequency-shift keying is a frequency modulation scheme in which digital information is transmitted through discrete frequency changes of a waveform. In one example, if the control system 202 generates four distinct waveforms, each one of the waveforms may correspond to a two-digit binary value. For example, the distinct waveforms may have frequencies of 1000 Hz, 1100 Hz, 1200 Hz, and 1300 Hz respectively. Table 1 below illustrates an example of an encoding scheme.

TABLE 1

| Frequency of Output Waveform | Binary Encoded Value |
|---|---|
| 1000 Hz | 00 |
| 1100 Hz | 01 |
| 1200 Hz | 10 |
| 1300 Hz | 11 |

To receive the data signal generated by the control system 202, the incoming signal conditioner 306 of the load communicator 208 may, for example, include a comparator. The comparator may generate a binary signal that changes state when the power signal changes state. The processor 302 in the load communicator 208 may count the number state transitions over a period of time to determine the frequency of the power signal. The processor 302 may then determine the data transmitted from the control system 202 based on the frequency of the power signal.

If the control system 202 transmits data using frequency-shift keying and the load communicator 208 transmits data using the switch circuit 210, both may transmit data simultaneously. The number of bits transmitted by the load communicator 208 in the period of the power signal may be limited primarily by the frequency response of the transmission medium 206 and the data recovery circuit 218 in the control system 202. The load communicator 208 may transmit multiple bits during one period. Consequently, the load communicator 208 may be able to transmit data at a higher rate than the load communicator 208 if the control system 202 transmits data frequency-shift keying.

Alternatively or in addition, the control system 202 may transmit data by digitally switching the amplitude of the current generated by the power device 216. Digitally switching the amplitude includes generating the current at discrete current levels. The load communicator 208 may receive the data transmitted by the control system 202 by detecting variations in the current flowing through a current detector, such as a resistor. Alternatively or in addition, the load communicator 208 may receive the data transmitted by the control system 202 by detecting variations in the line voltage, v(t).

Figure 8:
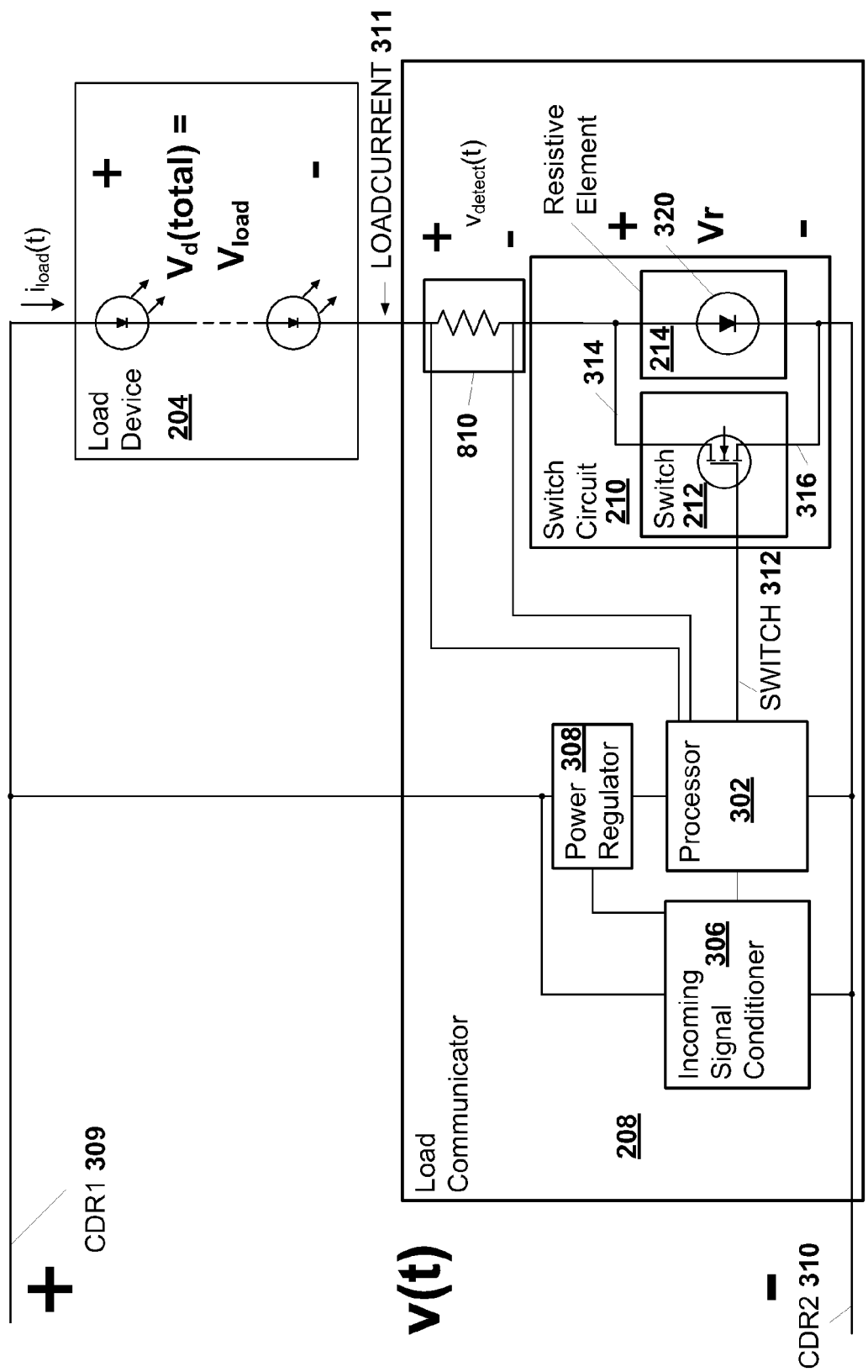
FIG. 8 illustrates a load communicator configured to detect variations in the current flowing through a load device.

FIG. 8 illustrates a load communicator 208 configured to detect variations in the current flowing through the load device 204 using the current detector 810 included in the load communicator 208. In a different example, the current detector 810 may be included in the load device 204. The current detector 810 may be any electronic component or combination of electronic devices configured to detect a change in current flow through the current detector 810. For example, the current detector 810 may be a resistor.

During operation, when the control system 202 digitally switches the current generated by the power device 216, the load communicator 208 may detect the variations in the current by detecting changes in the voltage drop across the current detector 810, $v_{detect}(t)$. The introduction of the current detector 810 connected in series with the load device 204 may alter the line voltage. The line voltage, v(t), may be $V_{load}+V_r+v_{detect}(t)$, where $v_{detect}(t)$ is the voltage drop across the current detector 810 and the voltage drop across the load device 204 and the resistive element 214 are substantially independent of the current flow. The control system 202 may compensate for $v_{detect}(t)$, because $v_{detect}(t)$ depends on the level of current generated by the control system 202. For example, the data recovery circuit 218 in the control system 202 may alter the operating point of the comparator 616 based on whether the control system 202 is currently digitally switching the DC power signal.

Figure 9:
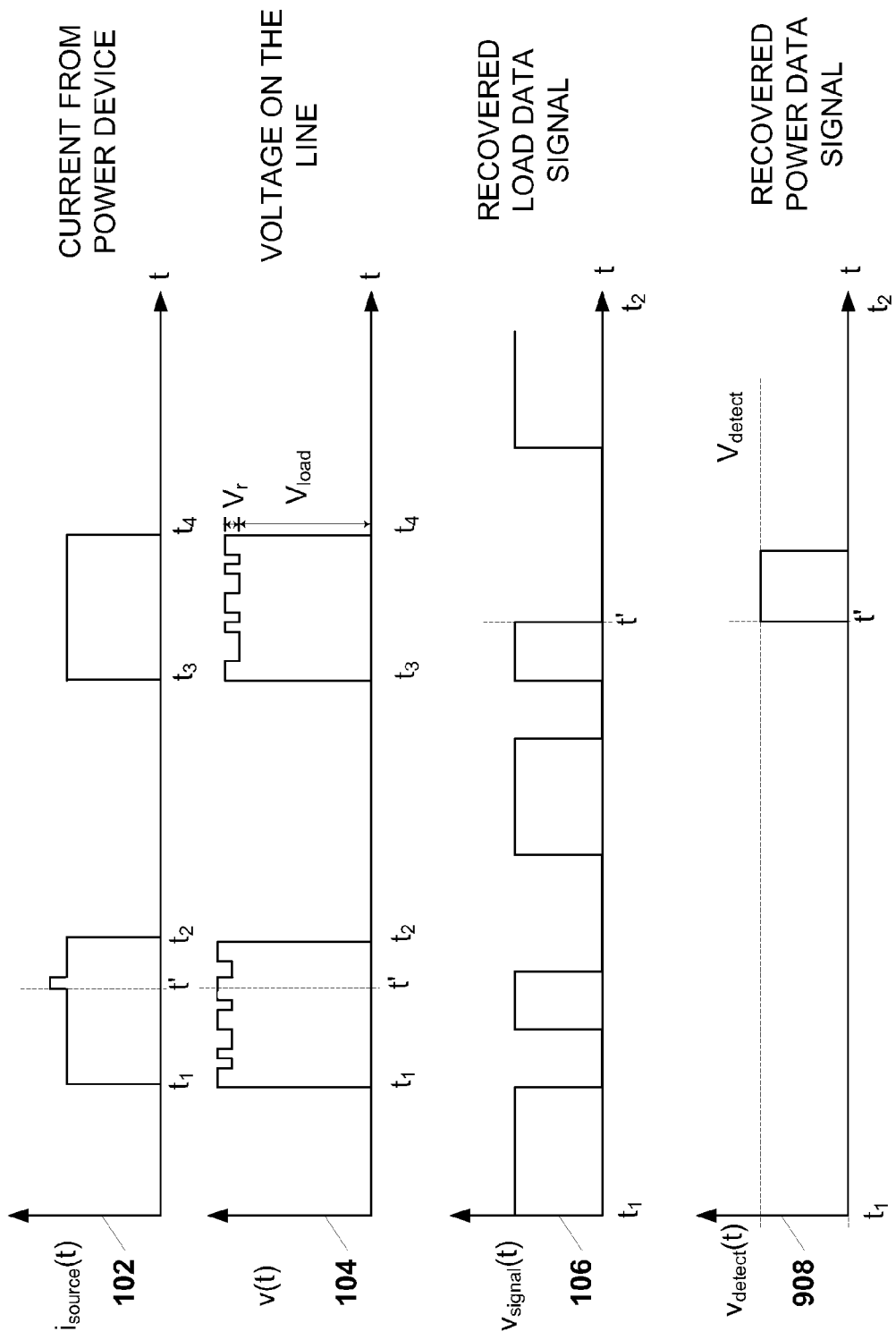
FIG. 9 illustrates example waveforms in a system to transmit data from the load communicator using the switch circuit and to transmit data from the power communicator by digitally switching the current of a DC power signal generated by a control system.

FIG. 9 illustrates example waveforms 102, 104, 106, and 908 in a system 200 to transmit data from the load communicator 208 using the switch circuit 210 and to transmit data from the power communicator 220 by digitally switching the current, $i_{source}(t)$, of the DC power signal generated by the control system 202. In the example illustrated in FIG. 9, the control system 202 digitally switches the DC power signal at time t'.

For example, as illustrated in the first waveform 102, the current, $i_{source}(t)$, of the DC power signal is digitally switched at time, t', in order to transmit a data bit from the control system 202. In the second waveform 104 illustrated in FIG. 8, the line voltage does not drop by $V_r$ back to $V_{load}$ at time, t', even though the data switch 212 is closed at t'. In the example illustrated in FIG. 9, the resistance of the current detector 810 and the particular current level of the DC power source are such that the voltage across the current detector 810, $v_{detect}(t)$, at t' when the DC power source is digitally switched, is equal to the voltage, $V_r$, across the resistive element 214 of the switch circuit 210. In a different example, $V_r$ may be not be the same as $v_{detect}(t)$ when the DC power source is digitally switched.

In one example, the control system 202 and/or the load communicator 208 may initiate a calibration sequence upon initialization of the system 200. Alternatively or in addition, the control system 202 and/or the load communicator 208 may initiate a calibration sequence at predetermined time intervals or in response to particular events. The control system 202 may use the calibration sequence to, for example: set the operating point of the comparator and/or synchronize clocks in the control system 202 and the load communicator 208.

Figure 10:
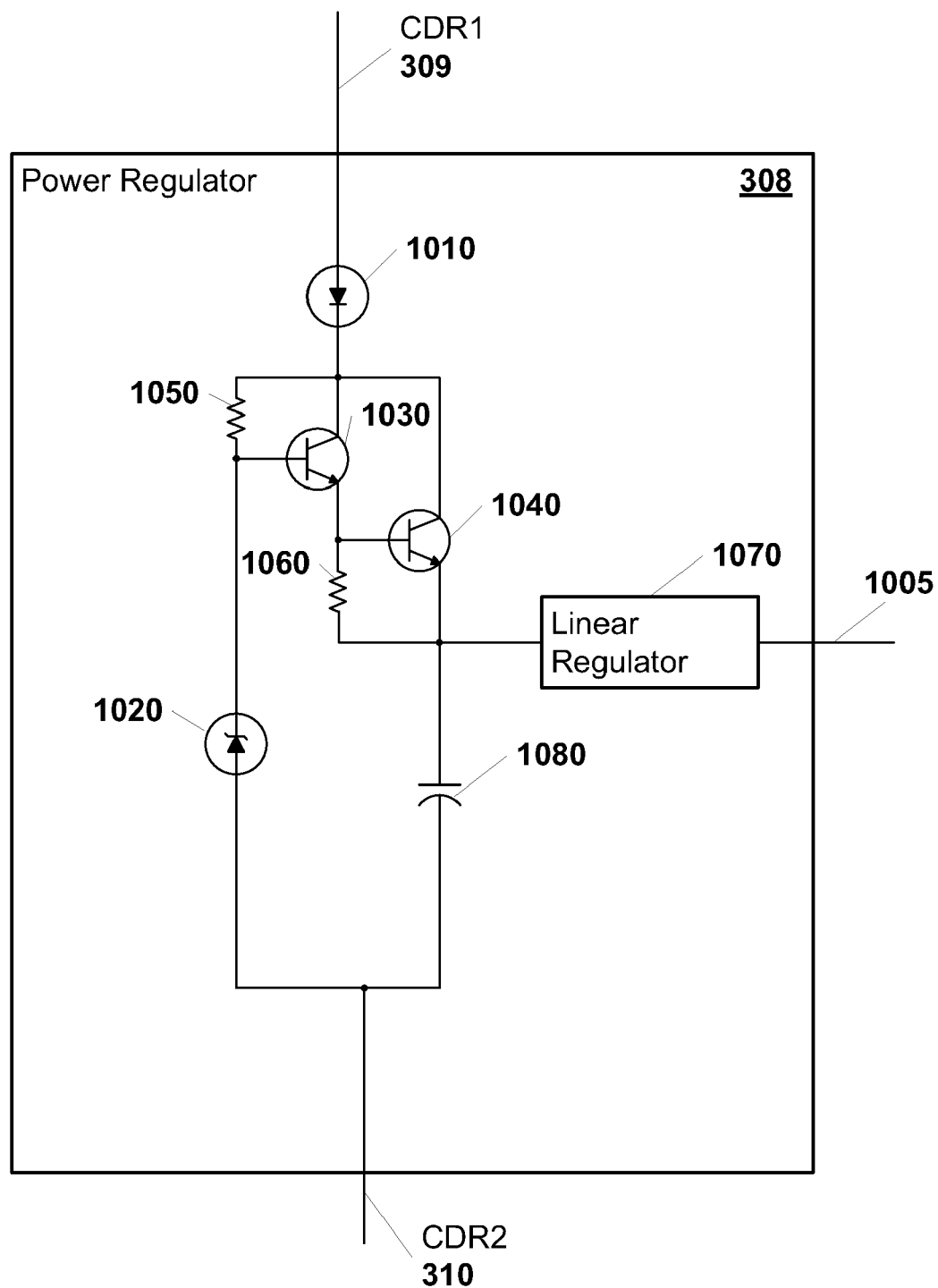
FIG. 10 illustrates an example implementation of a power regulator.

FIG. 10 illustrates an example implementation of the power regulator 308. As mentioned above, the power regulator 308 may be any circuit configured to store power received on the line and generate the regulated DC power signal 1005.

The example power regulator 308 illustrated in FIG. 10 includes a protection diode 1010, a Zener diode 1020, a first transistor 1030, a second transistor 1040, a first resistive element 1050, a second resistive element 1060, a linear regulator 1070, and a capacitive element 1080. In alternative examples, the power regulator 308 may include additional, fewer, or different components. For example, a Darlington transistor may be substituted for the first transistor 1030 and the second transistor 1040. In one example, the power regulator 308 may not include the protection diode 1010. In a second example, the power regulator 308 may include just the capacitive element 1080 and the linear regulator 1070.

The protection diode 1010 may be any component that permits current to flow in one direction but not the other. The Zener diode 1020 may be any component that permits current to flow in one direction, but also in the reverse direction if the voltage across the component is larger than a breakdown voltage.

The first transistor 1030 and the second transistor 1040 may be any transistors, such as NPN bipolar junction transistors. The first resistive element 1050 and the second resistive element 1060 may be any component having an electrical resistance, such as a resistor. The capacitive element 1080 may be any component having a capacitance, such as a capacitor. In one example, the Zener diode 1020 may have a breakdown voltage of 8.2 volts, the first resistive element 1050 may have a resistance of 470 Kohms, the second resistive element 1060 may have a resistance of 10 Kohms, and the capacitive element 1080 may have a capacitance of 10 µF. In alternative examples, the components may have different characteristics.

The linear regulator 1070 may be a voltage regulator based on an active device that behaves as a variable resistor, continuously adjusting a voltage divider network in order to maintain a constant output voltage. Examples of the linear regulator 1070 include series regulators and shunt regulators.

The anode of the protection diode 1010 may be connected to CDR1 309 to prevent current from flowing from the power regulator 308 to CDR1 309. The collector of the first transistor 1030 and the collector of the second transistor 1040 are connected to the cathode of protection diode 1010.

The base of the first transistor 1030 is connected to the first end of the first resistive element 1050, where the second end of the first resistive element 1050 is connected to the cathode of the protection diode 1010. The base of the first transistor 1030 is also connected to the cathode of the Zener diode 1020, where the anode of the Zener diode 1020 is connected to CDR2 310.

The emitter of the first transistor 1030 is connected to the base of the second transistor 1040 and to the first end of the second resistive element 1060. The second end of the second resistive element 1060 is connected to the emitter of the second transistor 1040.

The emitter of the second transistor 1040 is also connected to the first end of the capacitive element 1080. The second end of the capacitive element 1080 may be connected to CDR2 310. The emitter of the second transistor 1040 is additionally connected to an input of the linear regulator 1070. An output of the linear regulator 1070 provides the regulated DC power signal 1005 to the rest of the load communicator 208.

Figure 11:
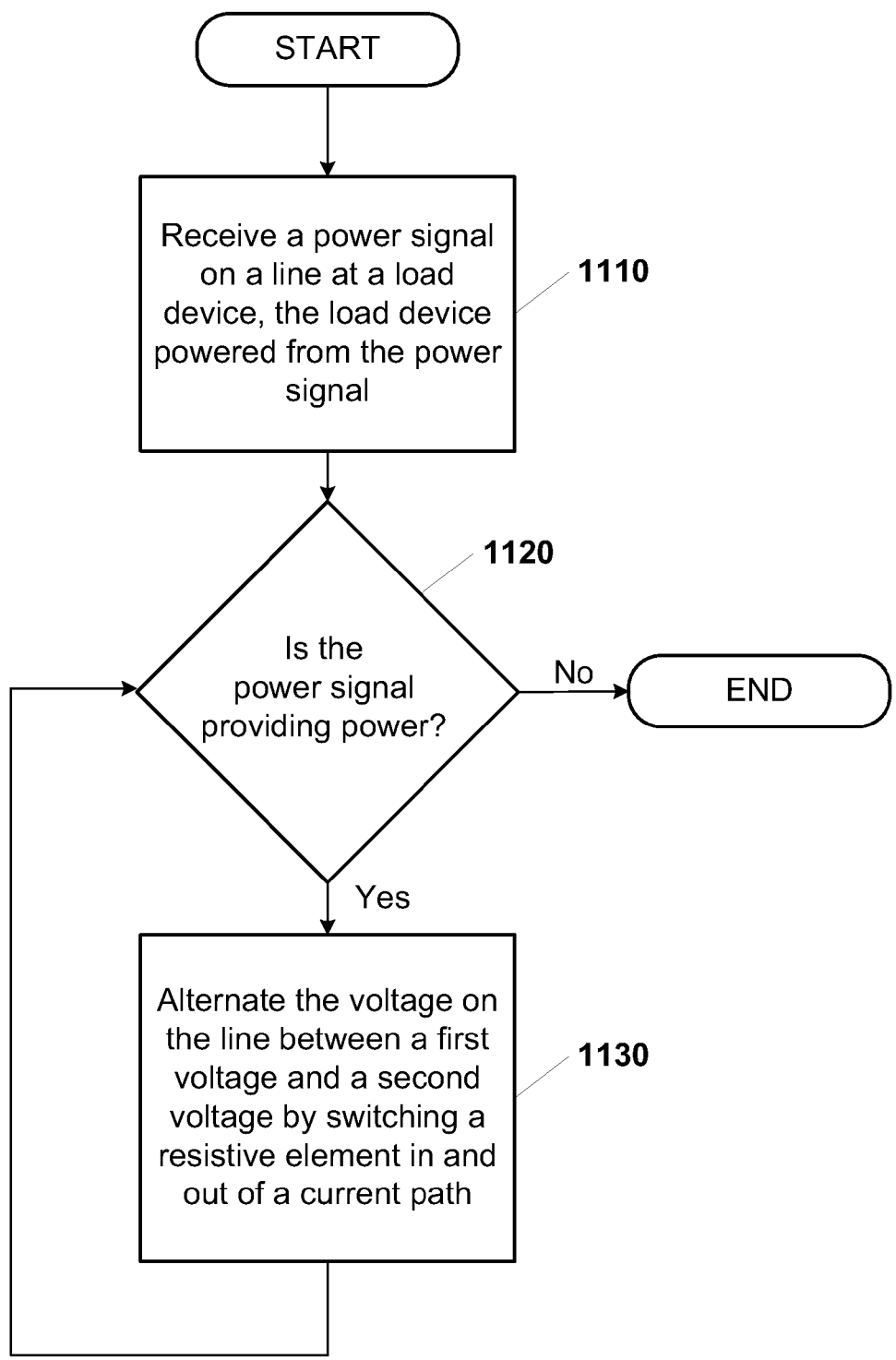
FIG. 11 illustrates an example embodiment of a method to transmit data using the switch circuit.

FIG. 11 illustrates an example embodiment of a method to transmit data using the switch circuit 210. Additional, different, or fewer acts may be performed. The acts may be performed in a different order than illustrated in FIG. 11.

In act 1110 of the embodiment illustrated in FIG. 11, the operation may begin by receiving the power signal, $i_{load}(t)$, at the load device 204 when the voltage, v(t), on the line is a first voltage and a second voltage. The voltage on the line is an electric potential difference between the first conductor 309 and the second conductor 310, where one of or both of the first conductor and the second conductor are in the line.

In act 1120, the operation may continue by determining whether the power signal, $i_{load}(t)$, is providing power. For example, the operation may include determining whether the current flowing through the load device 204 is non-zero. Alternatively or in addition, the operation may include determining whether the voltage on the line, v(t), is in the range bounded by and including the first voltage and the second voltage, or non-zero. Alternatively or in addition, the operation may include checking the value of a clock included in the load device 204 to determine whether the power signal, $i_{load}(t)$, should be non-zero based on where in the cycle of the power signal the power signal is. If the power signal is periodic, the value of the clock may indicate whether the power signal is powering the load device 204.

If the power signal is not providing power, the operation may end by, for example, waiting until the power signal is delivering power. Alternatively, if the power signal is delivering power, the operation may continue to act 1130.

In act 1130, the operation may continue by transmitting data over the line, wherein transmitting the data includes alternating the voltage on the line between the first voltage and the second voltage. For example, the operation may include alternating the voltage on the line by switching a resistive element in and out of a current path that passes from the first conductor 309 to the second conductor 310 through the load device 204. The operation may also include determining whether any more data is to be sent and, if not, ending the operation by waiting until more data is to be sent.

One advantage of the system 200 may be that the loss of power resulting from communicating data is less than in other systems. Another advantage of the system 200 may be that a single line may be used to transmit data from the load communicator 208 to the control system 202 and to power the load device 204 from the control system 202. The single line may be more cost effective than using multiple lines. Yet another advantage of the system 200 may be that the load communicator 208 may be constructed from inexpensive components.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:
1. An electric circuit electrically coupled to and for communicating over a line, the electric circuit comprising:
 a processor;

a switch electrically coupled in series with a load, the switch and the load in series between first and second conductors, the first and second conductors comprising the line, wherein the line provides direct current power to the load over the first and second conductors of the line; and a resistive element electrically coupled in parallel with the switch and in series with the load;

wherein the switch is configured to short circuit the resistive element when closed such that a voltage on the line varies between a first voltage level and a second voltage level when the switch is opened and closed;

wherein the voltage on the line is an electric potential difference between the first and second conductors;

wherein the line provides the direct current power to the load when the switch is opened and when the switch is closed;

wherein the processor is configured to direct the switch to vary the voltage on the line between the first voltage level and the second voltage level, the variation of the voltage on the line indicative of data transmitted over the line;

wherein the direct current power provided to the load over the first and second conductors of the line increases from a first power level to a second power level based on the data indicated by the variation of the voltage on the line between the first voltage level and the second voltage level; and wherein the voltage on the line varies between a third voltage level and a fourth voltage level when the switch is opened and closed at the second power level.

2. The electric circuit of claim 1, wherein the load and the resistive element are included in a load device and the switch is included in a separate device.

3. The electric circuit of claim 1, wherein the electric circuit and the load are included in a load device.

4. The electric circuit of claim 1, wherein the load includes a light fixture, and wherein the resistive element includes a light-emitting diode in the light fixture.

5. The electric circuit of claim 1, wherein the switch includes a transistor.

6. The electric circuit of claim 1, wherein a direct current power signal on the line provides the direct current power to the load, the electric circuit is configured to receive information included in the direct current power signal, the direct current power signal has a constant duty cycle but has different ones of a plurality of frequencies over time, and each one of the frequencies corresponds to a respective portion of the information.

7. The electric circuit of claim 1, wherein the first voltage level is less than the second voltage level, and the second voltage level minus the first voltage level is less than ten percent of the first voltage level.

8. A system comprising:

a power device electrically coupled to a line and configured to generate a direct current power signal over the line; and a power communicator in communication with the power device, the power communicator configured to receive data in a form of a plurality of variations of voltage on the line caused from a variation of resistance on the line during generation of the direct current power signal, wherein:

the direct current power signal is operable to power a load device during the plurality of variations of voltage on the line, the load device electrically coupled to the line, the load device comprising the load;

the power communicator is configured to direct the power device to increase the average power of the direct current power signal on the line that powers the load device from a first power level to a second power level in response to the data received on the line; and the variations of voltage on the line caused from the variation of resistance comprises variations between a first voltage and a second voltage at the first power level and between a third voltage and a fourth voltage at the second power level.

9. The system of claim 8, further comprising the load device and a load communicator:

wherein the load communicator is configured to transmit a switch signal to a switch for transmission of the data, wherein:

the variation of resistance on the line is in response to either a closure of a switch or an opening of the switch;

whether the switch is open or closed is based on the switch signal; and the switch is configured to control whether current on an electric current path from a first conductor to a second conductor through the load device flows through either the switch or a resistive element based on whether the switch is closed or open, respectively.

10. The system of claim 8, further comprising the load device, wherein the load device is a light fixture.

11. The system of claim 10 further comprising a photosensor electrically coupled to the line, wherein the power communicator is further configured to receive the data from the photosensor, the data including a light level detected at the photosensor, and, in response to receipt of the light level, to direct the power device to increase the power of the direct current power signal to the second power level.

12. The system of claim 8, wherein the direct current power signal is a pulse-width modulated signal and the power communicator is further configured to:

set a duty cycle of the pulse-width modulated signal to correspond to a determined power level; and vary a frequency of the pulse-width modulated signal for a transmission of information while the duty cycle of the pulse-width modulated signal is fixed for continued transmission of power at the determined power level, wherein a variation in the frequency of the pulse-width modulated signal represents at least a portion of the information.

13. A method comprising:

receiving a direct current power signal on a line at a load device, the load device powered from the direct current power signal when a voltage of the direct current power signal is at a first voltage level and a second voltage level, the direct current power signal having a first power level, wherein the voltage of the direct current power signal is an electric potential difference between first and second conductors, the first conductor and the second conductor comprising the line;

transmitting data over the line, wherein transmitting the data includes alternating the voltage of the direct current power signal on the line between the first voltage level and the second voltage level at the first power level by switching a resistive element in and out of a current path, the current path passing from the first conductor to the second conductor through the load device;

receiving, on the line at the load device, the direct current power signal having a second power level that is higher than the first power level in response to transmitting the data over the line; and transmitting information over the line, wherein transmitting the information includes alternating the voltage of the direct current power signal on the line between a third voltage level and a fourth voltage level at the second power level by switching the resistive element in and out of the current path, the third voltage level and the fourth voltage level higher than the first voltage level and the second voltage level, respectively, and the load device is powered from the direct current power signal when the voltage on the line is at the third voltage level and the fourth voltage level.

14. The method of claim 13 further comprising including the resistive element in a device different than the load device.

15. The method of claim 13, wherein powering the load device from the direct current power signal includes converting a pulse-width modulated signal to a regulated constant voltage signal, wherein the direct current power signal includes the pulse-width modulated signal.

16. The method of claim 13, wherein powering the load device includes illuminating at least one light-emitting diode from the direct current power signal when the voltage on the line is at the third voltage level and the fourth voltage level but not when the voltage on the line is at the first voltage level and the second voltage level, the at least one light-emitting diode included in a light fixture for building lighting.

17. The method of claim 13, wherein switching the resistive element in and out of the current path includes opening and closing a switch connected in parallel with the resistive element.

18. The method of claim 13 further comprising receiving information from the direct current power signal by detecting which ones of a plurality of determined frequencies the direct current power signal has over time while the direct current power signal maintains a constant duty cycle, wherein each one of the frequencies corresponds to a respective portion of the information and wherein the direct current power signal is a pulse-width modulated signal.

19. The method of claim 13 further comprising adjusting a resistance of the resistive element so that the second voltage minus the first voltage remains at less than twenty percent of the first voltage.

20. A system comprising:
a power device electrically coupled to a line and configured to generate a direct current power signal over the line;
a load device electrically coupled to the line, the load device powered from the direct current power signal;
a load communicator electrically coupled to the line; and
a power communicator in communication with the power device, the power communicator configured to communicate with the load communicator over the line through a pulse-width modulation of the direct current power signal, the load communicator configured to communicate data to the power communicator through alteration of impedance on the line during the pulse-width modulation and the powering of the load device,
the power communicator further configured to direct the power device to increase the average power of the direct current power signal on the line that powers the load device from a first power level to a second power level in response to the data communicated to the power communicator over the line, and
the alteration of impedance causes a change from a first voltage to a second voltage at the first power level and from a third voltage to a fourth voltage at the second power level.

21. The system of claim 20, wherein the alteration of impedance on the line includes a modification of resistance on the line.

22. The system of claim 20, wherein a calibration sequence is initiated for the power communicator to detect the change from the third voltage to the fourth voltage.

* * * * *